US012669993B2

(12) United States Patent
Huang et al.

(10) Patent No.: US 12,669,993 B2
(45) Date of Patent: Jun. 30, 2026

(54) ACCELERATING SUB-OPERATOR RECONCILIATION

(71) Applicant: INTERNATIONAL BUSINESS MACHINES CORPORATION, Armonk, NY (US)

(72) Inventors: Hui Huang, Beijing (CN); Chao Feng Wu, Beijing (CN); Yan Fen Guo, Beijing (CN); Xiao Jian Lian, Beijing (CN); Song Bai, Beijing (CN); Xiang Cai, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 18/542,891

(22) Filed: Dec. 18, 2023

(65) Prior Publication Data

US 2025/0199794 A1 Jun. 19, 2025

(51) Int. Cl.
*G06F 8/65* (2018.01)

(52) U.S. Cl.
CPC ...................................... *G06F 8/65* (2013.01)

(58) Field of Classification Search
CPC ................. G06F 8/65; G06F 8/60; G06F 8/61
USPC ......................................................... 717/168
See application file for complete search history.

(56) References Cited

U.S. PATENT DOCUMENTS 9,379,994 B2 6/2016 Wray
2013/0185359 A1 7/2013 Liu et al.

| 2015/0178108 A1 | 6/2015 | Tarasuk-Levin | |
| 2018/0300119 A1* | 10/2018 | Maruyama | B66B 5/0012 |
| 2021/0055917 A1 | 2/2021 | Khakare | |
| 2022/0050720 A1 | 2/2022 | Dumba | |
| 2022/0237017 A1 | 7/2022 | Kim | |
| 2023/0036657 A1* | 2/2023 | Simone | H04L 41/40 |
| 2023/0315403 A1* | 10/2023 | Liu | G06F 21/602 |
| | | | 713/193 |
| 2023/0393883 A1* | 12/2023 | Tsonov | G06F 9/542 |

(Continued)

FOREIGN PATENT DOCUMENTS

| CN | 12306567 A | 2/2021 |
| CN | 115357341 A | 11/2022 |

(Continued)

OTHER PUBLICATIONS

Office Action and Search Report dated Sep. 9, 2025 from Taiwanese Patent Office in TW 113146200 (which claims priority on present U.S. Appl. No. 18/542,891) (original and search report is 7 pages, machine translation is 7 pages).

*Primary Examiner* — Bradley A Teets
*Assistant Examiner* — Zengpu Wei
(74) *Attorney, Agent, or Firm* — Jordan T. Schiller

(57) ABSTRACT

A method, computer system, and a computer program product are provided. A child container orchestrator in a resource distribution hierarchical relationship with a parent container orchestrator is identified. Child container orchestrator-relevant resources of a parent container are automatically monitored for a state modification. The automatic monitoring is not comprehensive monitoring of all resources of the parent container. In response to the monitoring recognizing the state modification, the child container orchestrator is updated with the state modification.

20 Claims, 8 Drawing Sheets

(56)        References Cited

U.S. PATENT DOCUMENTS

| | | | | |
|---|---|---|---|---|
| 2025/0117208 A1* | 4/2025 | Palanisamy | ............... | G06F 8/65 |
| 2025/0267099 A1* | 8/2025 | Addaguduru | ............. | G06F 8/65 |

FOREIGN PATENT DOCUMENTS

| | | |
|---|---|---|
| CN | 115794318 A | 3/2023 |
| TW | 201211803 A | 3/2012 |

* cited by examiner

```
type dispatchEventMessage struct{}

// Create implements EventHandler
func (e * dispatchEventMessage) Create(ctx context.Context, evt event.CreateEvent, q workqueue.RateLimitingInterface) {
    // calls sub func to dispatch event message to the Processer when create event occur
    err := dispatchMessage(obj Object)
}

// Update implements EventHandler
func (e * dispatchEventMessage) Update(ctx context.Context, evt event.UpdateEvent, q workqueue.RateLimitingInterface){
    // calls sub func to dispatch event message to the Processer when update event occur
    err := dispatchMessage(obj Object)
}

// Delete implements EventHandler
func (e * dispatchEventMessage) Delete(ctx context.Context, evt event.DeleteEvent, q workqueue.RateLimitingInterface) {
    // calls sub func to dispatch event message to the Processer when delete event occur
    err := dispatchMessage(obj Object)
}

// Generic implements EventHandler
func (e * dispatchEventMessage) Generic(ctx context.Context, evt event.GenericEvent, q workqueue.RateLimitingInterface) {
    // calls sub func to dispatch event message to the Processer when generic event occur
    err := dispatchMessage(obj Object)
}
```

FIG. 4

```
// Sample function to dispatch event message to the Processer when events occur on monitored configuration objects
func dispatchMessage(obj Object) error{
    if ... // Object events occur on "content_configuration" section
        cmd := exec.Command("curl", "http:// 127.0.0.1:5000/endpoint", "-d", "message=Content configuration is changed")
    else if ... // Object events occur on "automation_configuration" section
        cmd := exec.Command("curl", "http:// 127.0.0.1:5000/endpoint", "-d", "message=Automation configuration is changed")
    else if ... // Object events occur on "document_configuration" section
        cmd := exec.Command("curl", "http:// 127.0.0.1:5000/endpoint", "-d", "message=Document configuration is changed")

_, err := Run(cmd)
    return err
}
```

FIG. 5

Parent Custom Resources
108

Parent Container Orchestrator
106

List of Objects to Monitor
306

Action Module
704

Listener Module
702

Document Orchestrator
116

Automation Orchestrator
114

Content Orchestrator
112

900

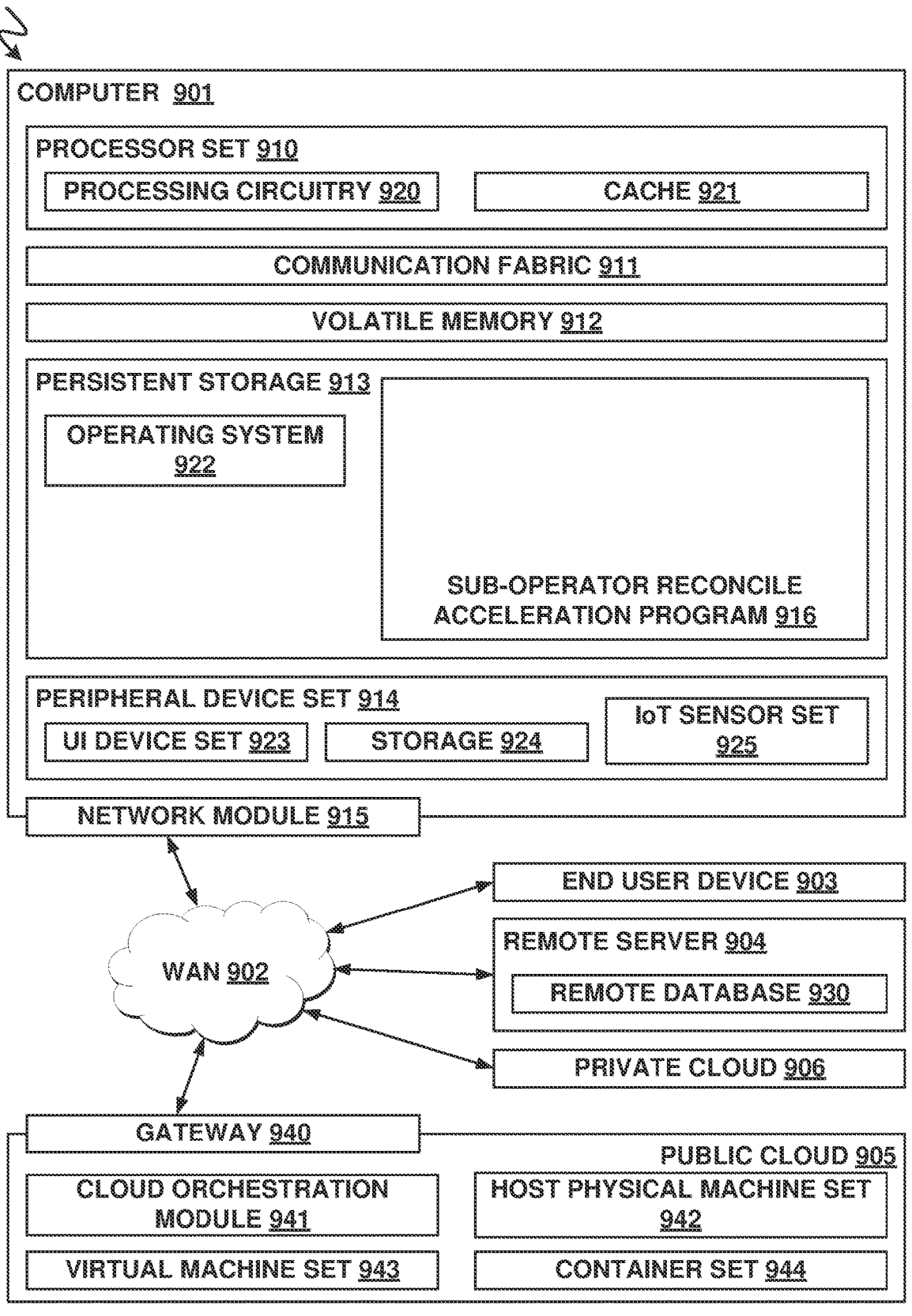

COMPUTER 901

PROCESSOR SET 910

PROCESSING CIRCUITRY 920          CACHE 921

COMMUNICATION FABRIC 911

VOLATILE MEMORY 912

PERSISTENT STORAGE 913

OPERATING SYSTEM 922

SUB-OPERATOR RECONCILE ACCELERATION PROGRAM 916

PERIPHERAL DEVICE SET 914

UI DEVICE SET 923          STORAGE 924          IoT SENSOR SET 925

NETWORK MODULE 915

WAN 902

END USER DEVICE 903

REMOTE SERVER 904

REMOTE DATABASE 930

PRIVATE CLOUD 906

GATEWAY 940

PUBLIC CLOUD 905

CLOUD ORCHESTRATION MODULE 941          HOST PHYSICAL MACHINE SET 942

VIRTUAL MACHINE SET 943          CONTAINER SET 944

FIG. 8

ACCELERATING SUB-OPERATOR RECONCILIATION

BACKGROUND

The present invention relates generally to software tools which enable infrastructure as code, which perform configuration management, and which achieve application deployment functionality.

SUMMARY

According to one exemplary embodiment, a computer-implemented method is provided. A child container orchestrator in a resource distribution hierarchical relationship with a parent container orchestrator is identified. Child container orchestrator-relevant resources of a parent container are automatically monitored for a state modification. The automatic monitoring is not comprehensive monitoring of all resources of the parent container. In response to the monitoring recognizing the state modification, the child container orchestrator is updated with the state modification. A computer system and computer program product corresponding to the above method are also disclosed herein.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings:

FIG. 4 illustrates software code enhancements for carrying out aspects of the sub-operator reconciliation acceleration using an event handler module according to at least one embodiment;

FIG. 5 illustrates software code enhancements for carrying out event message dispatching for sub-operator reconciliation acceleration according to at least one embodiment;

FIG. 8 illustrates a networked computer environment in which sub-operator reconciliation is accelerated according to at least one embodiment.

DETAILED DESCRIPTION

Figure 1:
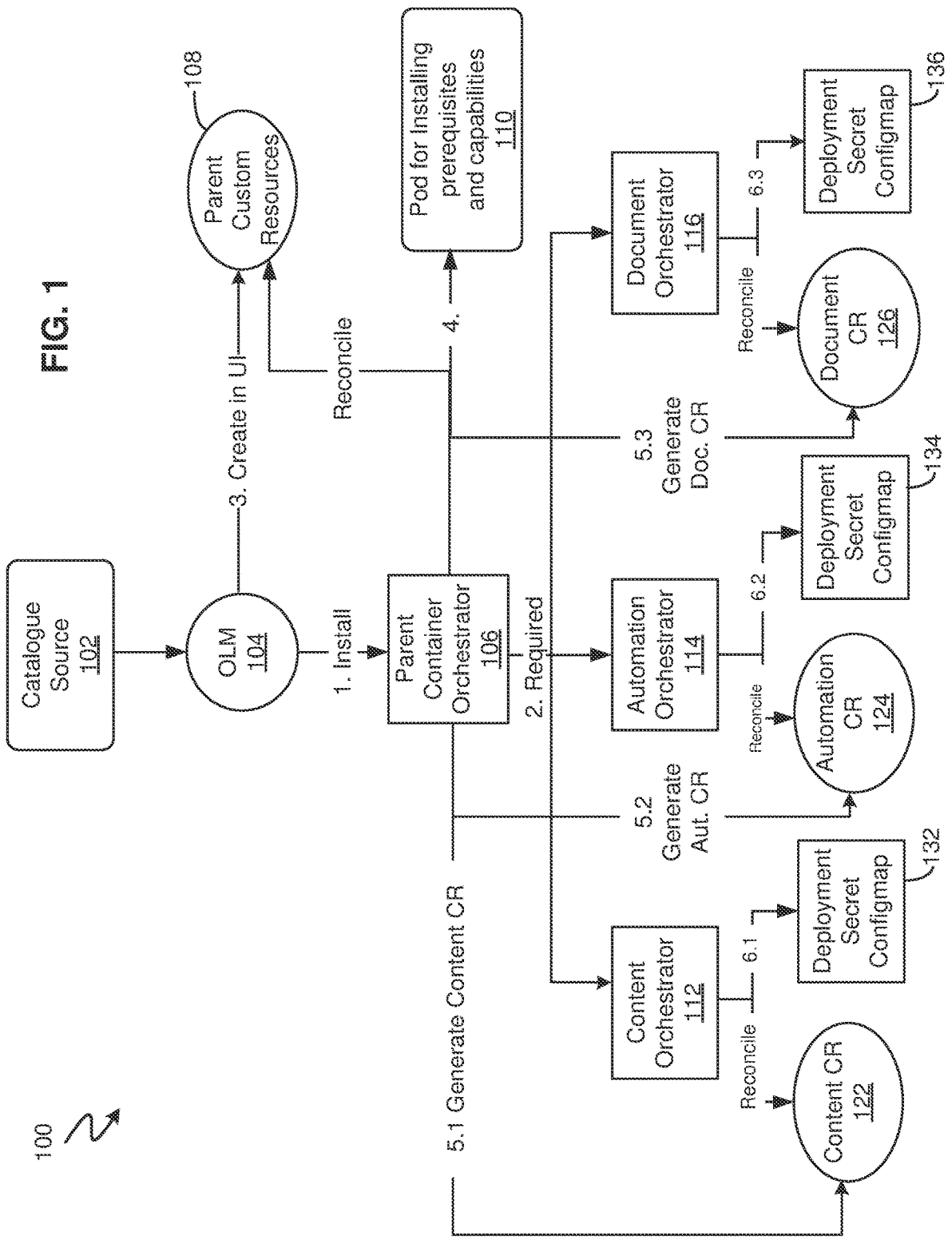
FIG. 1 illustrates a computer resource distribution hierarchy with a parent container orchestrator and multiple children container orchestrators according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

A modular set of integrated software components, built for a hybrid cloud, often includes a hierarchy of containers and operators for distributing and providing access to various computing resources, software modules, and/or computing features. Some software packages assemble certified software on multiple cloud infrastructures. A family of containerization software products includes a parent container orchestrator as a main operator for governing and controlling access given to children container orchestrators as sub-operators. In some instances, a container orchestrator is referred to herein as an operator or a sub-operator. An operator is a tool that watches and responds to resources in a cluster to enable a software application to run as desired. The parent container orchestrator has roles to install prerequisites and capabilities and creates child custom resources by extracting component relevant configurations and combining common configurations. Afterwards, child container orchestrators will consume the corresponding child custom resource to install components. The parent orchestrator and the children orchestrators (operators and sub-operators) together constitute a resource distribution hierarchy with respect to feature access and data access. The present embodiments provide enhancements to resource updating in such a hierarchy and include a computer-implemented automated method, computer system, and computer program product to accelerate the reconciliation of a child container and child container orchestrator with updates to main orchestrator/container resources and configurations.

Currently, some such hierarchies restrict users to make parameter modifications from the custom resources of the parent operator. Afterwards, the parent operator will pick up the changes to create new child custom resource sets in a next reconciliation. In other words, sub-operators must wait for new child custom resource sets to be created by the parent operator before the child operator is able to be patched with changes. Some components are still deployed using the parent operator, along with install prerequisites and capabilities. In general, the parent operator has previously taken around twenty to thirty minutes to complete a resource reconciliation process so that resource and configuration updates reach all of the children operators for their implementation by the children operators. A single child operator (sub-operator) is dependent on the comprehensive update being performed.

One problematic case is that a change from the custom resources of a parent operator results in a restart of some of the pods that were created in the stage of installing prerequisites. If some of the pods fail to start on time or even fail to start at all for some reason (for instance due to a storage issue, network issue, etc.), then the parent operator reconciliation is terminated due to failure indicated via a pods check. If the pods check is run before the creation of a custom resource set for a child operator, the parent operator will no longer pick up the changes to create new child custom resource sets, and sub-operators are unable to consume those new changes anymore.

The present embodiments help overcome slowness of the reconciliation process. The present embodiments include computer-implemented methods, computer systems, and computer program products that accelerate sub-operator reconciliation when a change is coming up from a parent custom resource. For example, if the custom resource of the parent main operator associated with a particular child operator, e.g., a content configuration child operator, changes, the custom resource for the child operator will be updated immediately. Afterwards the content sub-operator will consume the content child custom resource to be patched and will no longer wait for a new content child custom resource to be created by the main parent operator in the next reconciliation. At least some embodiments perform the acceleration by using two main modules: a listener module and an action module. The listener module is responsible for watching state modification of component relevant configurations from the parent custom resource and for dispatching the corresponding event message to the action module. The action module is responsible for listening and receiving incoming connections and will trigger the relevant action when conditions are met.

FIG. 1 illustrates a computer resource distribution hierarchy 100 with a parent container orchestrator and multiple children container orchestrators according to at least one embodiment. FIG. 1 also illustrates steps of generating and updating the hierarchy 100. From a cloud offerings catalogue source 102, an operator lifecycle manager 104 is generated and helps users install, update, and manage the lifecycle of native applications/operators and their associated services running across container platform clusters.

From the operator lifecycle manager 104, in a first step a parent container orchestrator 106 is installed. The parent container orchestrator 106 is an operator that is a software module that watches and responds to the resources in a cluster to enable an application to run as desired. The operator in some embodiments includes (1) a small chunk of software code which handles the interfacing between external links and the operator and (2) a container which receives events from the interfacing code and executes code as required.

In a second step the parent container orchestrator 106 generates sub-operators, also known as children operators or children container orchestrators. These sub-operators are also operators meeting the definitions of operators as described above but which receive their computing software resources exclusively from the parent container orchestrator 106 and/or from the parent custom resources 108. FIG. 1 shows three children container orchestrators (sub-operators)—the content orchestrator 112, the automation orchestrator 114, and the document orchestrator 116. The automation orchestrator 114 in some embodiments helps a user access machine learning to make decisions, e.g., business decisions. The document orchestrator 116 in some embodiments provides document processing capabilities to a user through the cloud.

In a third step the operator lifecycle manager 104 creates parent custom resources 108. A user using a remote computer accesses a user interface to perform this creation in the third step in some embodiments. The custom resources (CRs) control the configuration of a microservice for an instance and include modifiable settings. The CR settings include, for example, number of tenants, number of replicas, CPU size and limits, memory limits, etc.

In a fourth step the parent operator 106 creates an installation pod 110 for installing prerequisites and installing capabilities. A pod is a group of one or more containers, with shared storage and network resources, and a specification for how to run the containers. The contents of a pod are co-located and co-scheduled, and run in a shared context.

In a fifth step, custom resources for the sub-operators are generated from the parent container orchestrator 106. FIG. 1 shows this fifth step divided into three sub-steps, with a generation of content custom resources 122 for the content orchestrator 112, a generation of automation custom resources 124 for the automation orchestrator 114, and a generation of document custom resources 126 for the document orchestrator 116.

In a sixth step, the custom resources for the sub-operators are reconciled and deployment secret configuration maps are generated for the sub-operators. FIG. 1 shows three deployment secret configuration maps 132, 134, 136 for the three illustrated sub-orchestrators 112, 114, 116, respectively. A configuration map is an application programming interface (API) object used to store data in key-value pairs. Pods can consume configuration maps as environment variables, command-line arguments, and/or as configuration files in a volume. The reconciliations that occur here in a sixth step can experience the delay issues as described above for synchronizing changes in parent custom resources to the custom resources for the sub-operators.

Figure 2:
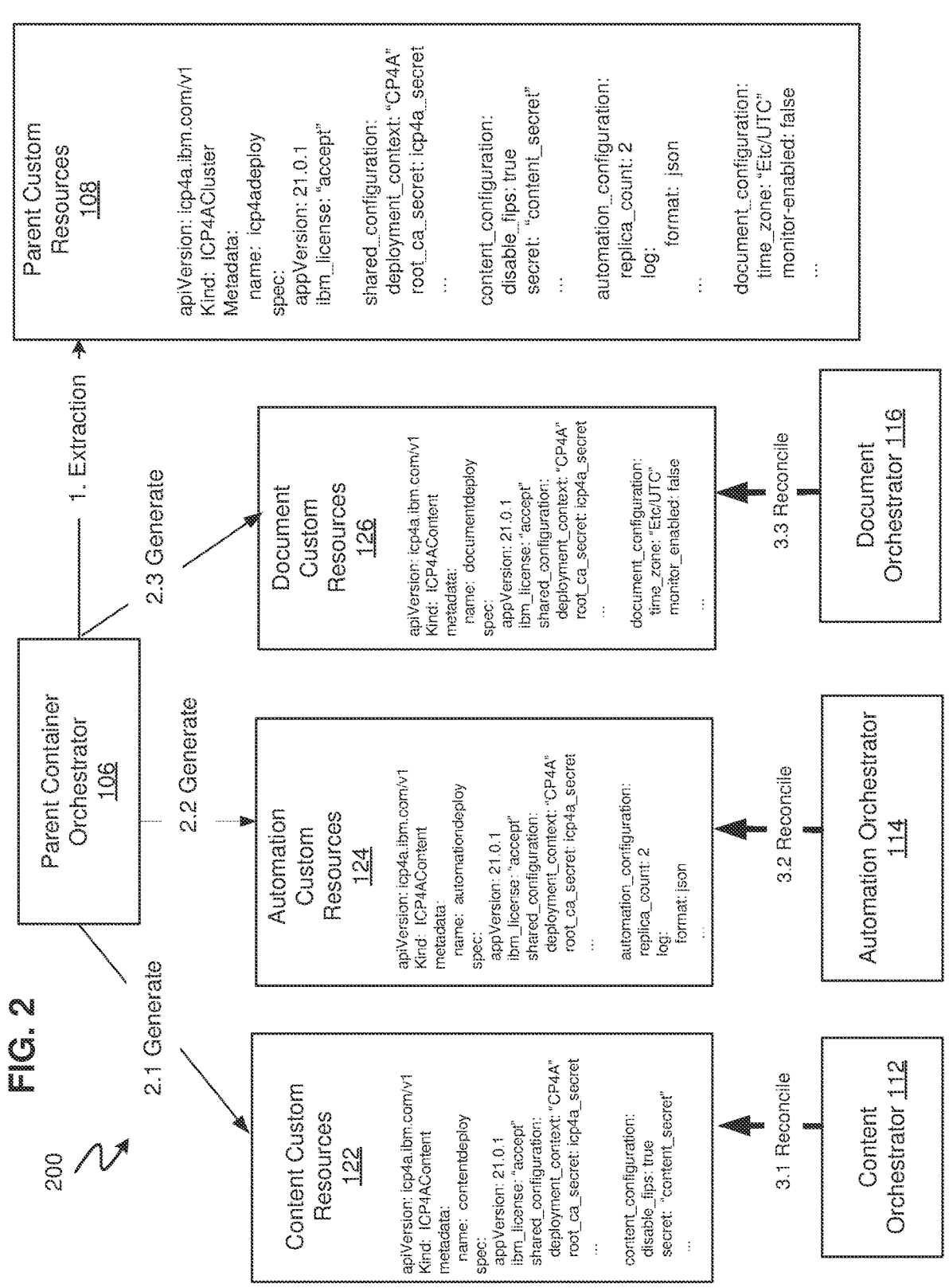
FIG. 2 illustrates a pipeline for creating custom resources for a child container orchestrator from the custom resources of a parent container orchestrator according to at least one embodiment.

FIG. 2 illustrates a pipeline 200 for creating custom resources for a child container orchestrator from the custom resources of a parent container orchestrator according to at least one embodiment. This pipeline 200 for creating custom resources for a child container orchestrator provides details of the hierarchy 100 shown in FIG. 1. The pipeline 200 illustrates the parent container orchestrator 106, the parent custom resources 108, the content custom resources 122, the automation custom resources 124, the document custom resources 126, the content orchestrator 112, the automation orchestrator 114, and the document orchestrator 116 that were shown in FIG. 1. The pipeline 200 of FIG. 2 includes additional details about some of these elements that are applied in one or more embodiments.

The pipeline 200 shows that the parent container orchestrator 106 has received parent custom resources 108 e.g., from the cloud offerings catalogue source 102 and/or the operator lifecycle manager 104. The parent container orchestrator 106 extracts, in a first pipeline step, resources from the parent custom resources 108 in order to use these resources to generate custom resources for the sub-operators, e.g., for the children container orchestrators. The same three custom resources 122, 124, 126, for the sub-operators (children container orchestrators) 112, 114, 116 that were shown in FIG. 1 are also illustrated (content custom resources 122, automation custom resources 124, and document custom resources 126) and the content orchestrator 112, automation orchestrator 114, and document orchestrator 116 are also illustrated in the pipeline 200 of FIG. 2. In the third step shown in the pipeline 200, the sub-operators use their respective child custom resources to reconcile and for patching themselves.

For the pipeline 200, the parent container orchestrator 106 has roles to install prerequisites and capabilities and creates the child custom resources by extracting component relevant configurations and combining common configurations from the parent custom resources 108. Afterwards sub-operators 112, 114, 116 will consume the corresponding child custom resource to install components.

FIG. 2 illustrates that the child custom resources 122, 124, 126 take code elements that are present in the parent custom resources 108.

The hierarchy 100 shown in FIG. 1 (and with some of its elements shown in FIG. 2) restricts users to make parameter modifications from the custom resources of the parent operator. Afterwards, the parent operator will pick up the changes to create new child custom resource sets in a next reconciliation. In other words, sub-operators must wait for new child custom resource sets to be created by the parent operator before the child operator is able to be patched with changes. Some components are still deployed using the parent operator, along with install prerequisites and capabilities. In general, the parent operator in the past has taken around twenty to thirty minutes to complete a resource reconciliation process so that resource and configuration updates reach all of the children operators for their implementation by the children operators.

The present embodiments include computer-implemented methods, computer systems, and computer program products that accelerate this sub-operator reconciliation. A child container orchestrator in a resource distribution hierarchical relationship with a parent container orchestrator is identified. Child container orchestrator-relevant resources of the parent container are automatically monitored for a state modification. The automatic monitoring is not comprehensive monitoring of all resources of the parent container. In response to the monitoring recognizing the state modification, the child container orchestrator is updated with the state modification.

In this manner, the present embodiments achieve the advantages of acceleration of sub-operator reconciliation. For example, the previous twenty to thirty minutes required to patch changes from the parent custom resource 108 for implementation to the sub-operators can take less than one minute. With the present embodiments, the operators have the capability to watch state modification of component relevant configuration objects from the parent custom resources instead of watching the entire "spec" object in the parent custom resource. With the present embodiments, an operator developer can quickly debug code by making parameter modifications from the parent custom resources. An operator tester can quickly test code path by making parameter modifications from the parent custom resources. The present embodiments can be applied in an Ansible® toolkit space but also with operators developed in other programming languages of which Go and Helm are examples. Other programming languages could be used as well in other embodiments.

Figure 3:
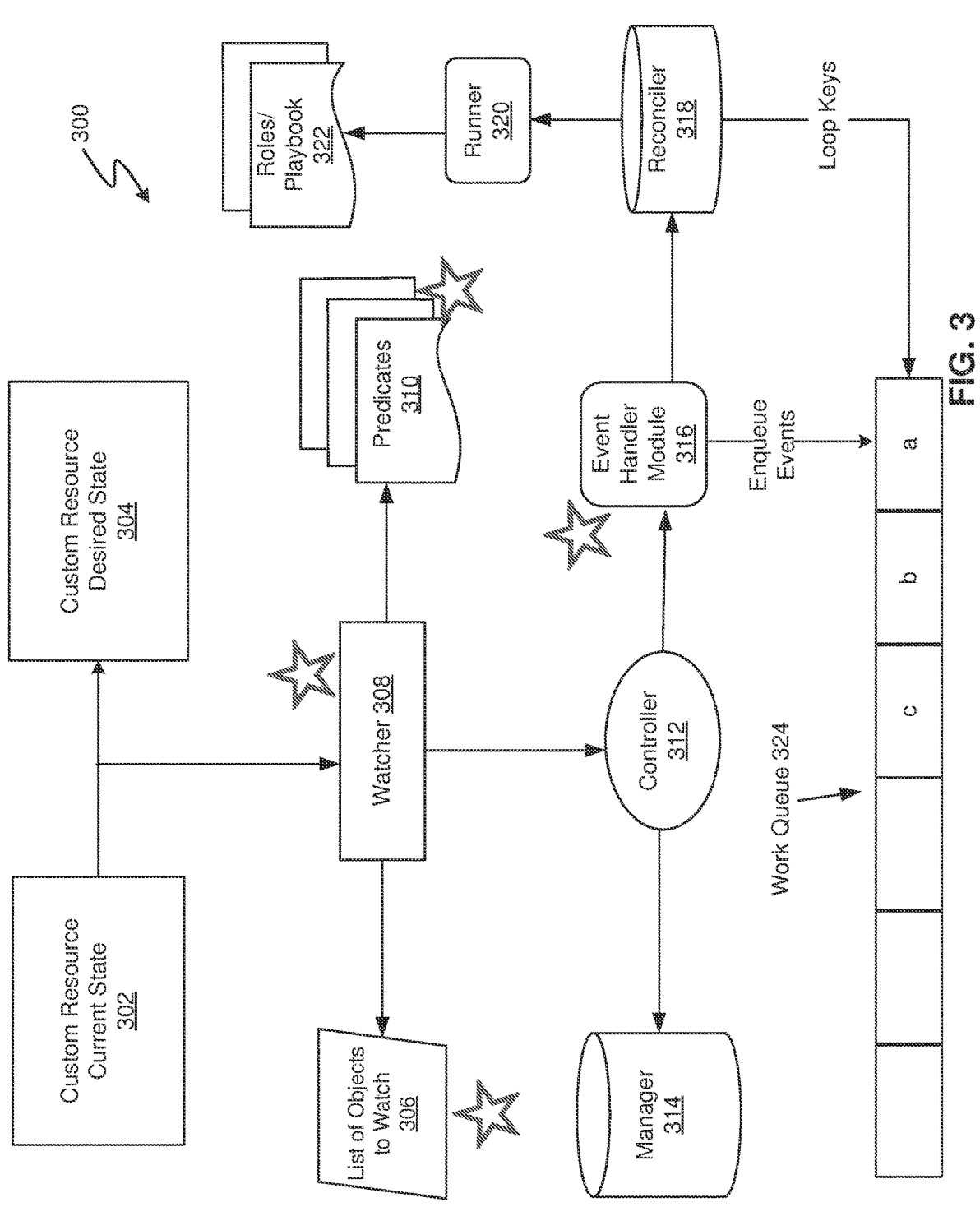
FIG. 3 illustrates an enhanced operator software development kit framework for accelerating sub-operator reconciliation according to at least one embodiment.

FIG. 3 illustrates an enhanced operator software development kit framework 300 for accelerating sub-operator reconciliation according to at least one embodiment. With the four stars illustrated in the framework 300 in FIG. 3, the positioning of the listener module and the action module within the framework 300 for the present embodiments is indicated. FIG. 3 shows that the watcher module 308 monitors the custom resources of the parent container to learn the current state 302 of those custom resources. A desired state 304 of the custom resources is also monitored by the watcher module 308. For example, a current state 302 in one example includes:
    apiVersion: icp4a.ibm.com/v1
    kind: ICP4ACluster
    metadata:
        name: icp4adeploy
    spec:
        content_configuration:
        disable_fips: true A corresponding desired state 304 in that example includes:
    apiVersion: icp4a.ibm.com/v1
    kind: ICP4ACluster
    metadata:
        name: icp4adeploy
    spec:
        content_configuration:
        disable_fips: false The listener module automatically monitors child container orchestrator-relevant resources of the parent container for a state modification. The automatic monitoring is not comprehensive monitoring of all resources of the parent container. In response to recognizing the specified state modification in a parent container, the listener module dispatches an event message to the action module. In an Ansible® operator environment, the listener module enhances Watcher and Event Handler modules of the Ansible® operator. The enhancement includes creating the capability for this operator to watch for any state modification of component relevant configurations from the parent custom resources and, upon recognition of such state modification, to dispatch the corresponding event message to the action module. A new watch option is added in a software code list of mappings of custom resources. For example, in an Ansible® setting the new watch option is added to the Watches file (/opt/ansible/watches.yaml). The new watch option allows a user to customize which component relevant configurations will be monitored for updates. The watch option identifies a list of configuration objects based on their names as defined in the parent custom resource 108. A new function parses the configuration objects and creates a respective corresponding predicate that is used to filter events based on the particular configuration object. New structure implements an event handler module to dispatch corresponding event message(s) to the action module in response to events (i.e., change caused by a create, update, delete, etc.).

The list of objects to watch 306 is accessed by a watcher module 308 for the watcher module 308 to know what state modifications in the parent custom resources 108 are of interest to a user. In some embodiments, the list of objects to watch 306 contains a list of mappings of certain custom resources to certain actions to take. In some embodiments the list of mappings is organized by group, version, and/or kind of mappings. For an Ansible® environment the list 306 is a watches.yaml file. In some embodiments, a designation of the child container orchestrator is received and in response a name of the designated child container orchestrator is added to the software code list of mappings 306 of custom resources. In some embodiments, a user uses a user interface of the program 916 to designate a child container for addition to the list 306. In other embodiments, a user uses a user interface of the program 916 to initiate a review of all child containers in operation for the user and the addition to the list 306 for each identified respective name of the child containers.

In some embodiments, the program 916 automatically parses the software code list 306 of mappings of custom resources to identify one or more names of respective identified child container orchestrators. For any identified name, the program 916 creates a respective monitoring predicate 310 for the identified names. In the framework 300 shown in FIG. 3, this parsing, identification, and creation is performed via the listener module which is an enhancement for the watcher module 308. A predicate is a software code that tests a true/false condition and through the test allows data to be filtered. By the monitoring predicates 310 being created for the child-specific resources in the parent, automatic monitoring of child container orchestrator-relevant resources of the parent container for a state modification is carried out without performing a comprehensive monitoring of all resources of the parent container.

In response to the watcher module 308 recognizing a state modification to a child container orchestrator-relevant resource of the custom resources of the parent container, a notification is sent to the controller 312 and to the manager module 314. The controller 312 forwards the notification to the event handler module 316 which performs those actions specified in the monitoring predicates 310 for the recognized modification. Thus, the action module constitutes an enhancement of part of the event handler module 316. The event handler module 316 transmits an operation command to the reconciler 318, which forwards the command to the runner 320 which consults with the roles/playbook database 322. The reconciler 318 performs loop keys to the work queue 324. The event handler module 316 enqueues events for the work queue 324 by adding events to the work queue 324. These components perform the specified actions so that the custom resources of the child container orchestrator are updated to match the state modification in the parent custom resources. The updated custom resources of the child container orchestrator are applied to the child container. The operator pod of the parent container orchestrator is restarted in response to the child container orchestrator being updated with the state modification.

In one example in an Ansible® environment for a framework 300, users specify component relevant configuration names to be added to a watch list. This addition occurs via a new watch option in a Watches file. As a consequence of the addition, all resources under the specified configuration objects will be monitored for updates. Code for making this update is provided below for a watches.yaml file, with the new code indicated in the fifth through eight lines of this code section:

```
version: v1
group: icp4a.ibm.com
kind: ICP4ACluster
role:/opts/ansible/roles/icp4a
watchConfigurationScopedResources:
    "content_configuration"
    "automation_configuration"
    "document_configuration"
reconcile period: 5 m
manageStatus: false
```

In another example in a golang coding environment for a framework 300, a new watch option is defined to hold data that is used to create a mapping of group, version, and kind. The enhancement of the watcher module 308 is shown below for this golang coding environment in watches.go, with the enhancement in the last line (last two lines) of this code section:

```
type Watch struct {
    Group VersionKind schema.Group VersionKind
        'yaml: ",inline"'
    Blocklist [ ]schema.Group VersionKind 'yaml: "block-
        list"'
    Playbook string 'yaml:"playbook"'
    Role string 'yaml:"role"'
    Vars map [string] interface{ } 'yaml:"vars"'
    MaxRunnerArtifacts int 'yaml:"maxRunnerArtifacts"'
    ReconcilePeriod metav1.Duration 'yaml:"reconcilePe-
        riod"'
    . . .
```

8

```
ConfigurationResources [ ]metav1.Configuration-
    ScopedResources 'yaml:"watchConfiguration-
    ScopedResources"'
```

For a supplement to the example in the golang coding environment for a framework 300, an enhancement is added to the controller 312 as well. This enhancement iterates the configuration objects in the watch options and calls a new function to create the corresponding predicate and append the newly-created predicate to the predicates of the watch. The enhancement of the controller 312 is shown below for this golang coding environment in controller.go, with the enhancement including all lines in this coding section past the fourth line:

```
// Set up predicates
predicates:=[ ]ctrlpredicate.predicate{
ctrlpredicate.Or (ctrlpredicate.GenerationChangedPredi-
    cate{ }, libpredicate.NoGenerationPredicate{ }),
}
for_, config:=range options. ConfigurationResources{
    p, err:=parsePredicateConfigurationResources(config)
    if err!=nil{
        log.Error(err, " ")
        os.Exit(1)
    }
    If p!=nil {
        predicates=append(predicates, p)
    }
}
```

For a supplement to this example in the golang coding environment for a framework 300, a further parsing enhancement for the controller 312 cause the configuration object to be parsed in the watch options to create a respective predicate that is used to filter events based on the particular configuration object. An example of this parsing enhancement code is shown below for controller.go (all of the code in this section below is the enhancement): func parsePredi-cateConfigurationResources (config metav1.ConfigurationScopedResources) (ctrlpredicate.Predicate, error) {

```
//If a configuration object has been specified in
    watches.yaml, add it to the watch's predicates
If !reflect.ValueOf(config.IsZero( ) {
    p, err: =ctrlpredicate.ConfigurationScopedPredicate
        (config)//Creates a predicate
    if err!=nil {
        return nil, fmt.Errorf("error constructing predicate
            from watches configuration object: % v", err)
    }
    return p, nil
}
return nil, nil
}
```

For a further supplement to this example in the golang coding environment for a framework 300, a further parsing enhancement for the framework 300 includes watching the parent custom resources and using an event handler module 316 to dispatch the corresponding event message in response to events. One or more predicates are provided to filter events before they are given to the event handler module 316. An example of this parsing enhancement code is shown below for controller.go (all of the code in this section below is the enhancement):

```
u:=&unstructured. Unstructured { }
u.SetGroupVersionKind(options.GVK)
err=c.Watch(&source.Kind{Type: u}, &handler.dispatch-
    EventMessage{ }, predicates . . . )
if err !=nil {
```

```
        log.Error (err, " ")
        os.Exit (1)
    }
```

For a further supplement to this example in the golang coding environment for a framework 300 (e.g., for controller.go), an enhancement for the event handler module 316 includes the code set forth in FIG. 4.

For a further supplement to this example in the golang coding environment for a framework 300 (e.g. for controller.go), another enhancement for the event handler module 316 includes the code set forth in FIG. 5. This code of FIG. 5 causes the event handler module 316 to dispatch corresponding event messages to the action module (e.g., to action module 704 shown in FIG. 7) based on different object events.

Figure 7:
FIG. 7 illustrates a system framework for accelerating sub-operator reconciliation according to at least one embodiment.

The action module 704 shown in FIG. 7 leverages coding language structure to define event sources, rules, and actions. With an Ansible® rulebook, the action module 704 continues to run, waits for events, and matches those events. An event source is defined to start a process. The program 916 controls that the designated event source is monitored and the listener module 702 monitors the parent custom resources for the particular event source. For instance, the code implements a webhook to monitor for incoming connections. The webhook is a user-defined callback. The action module 704 defines conditionals for matching with the event source. If the condition is met, then the stored trigger action is performed/initiated via the action module 704. When the condition is met, the action module 704 performs or initiates the corresponding action that was saved. In one example, a rulebook sample implemented via the action module 704 includes the following code that updates changes to the respective child custom resource, applies the child custom resource, and restarts the parent operator pod to make sure that the parent operator reconciles the same parameters with the child to avoid data inconsistency:

```
    ## Define webhook as event source to listen for incoming
        connections
    sources:
        ansible.eda.webhook:
        host: 0.0.0.0
        port: 5000
    ## Define the conditions we are looking for
    rules:
        name: Check for Content configuration modification
        Condition:  event.payload.message=="Content con-
            figuration is changed"
    ## Define the action we should take should the condition
        be met
    action:
        run_playbook:
            name: update_content_sub_cr.yml
    name: Check for Automation configuration modification
    condition:  event.payload.message=="Automation con-
        figuration is changed"
    action:
        run_playbook:
            name: update_automation_sub_cr.yml
    name: Check for Document configuration modification
    condition: event.payload.message=="Document configu-
        ration is changed"
    action:
        run_playbook:
            name: update_document_sub_cr.yml
```

Figure 6:
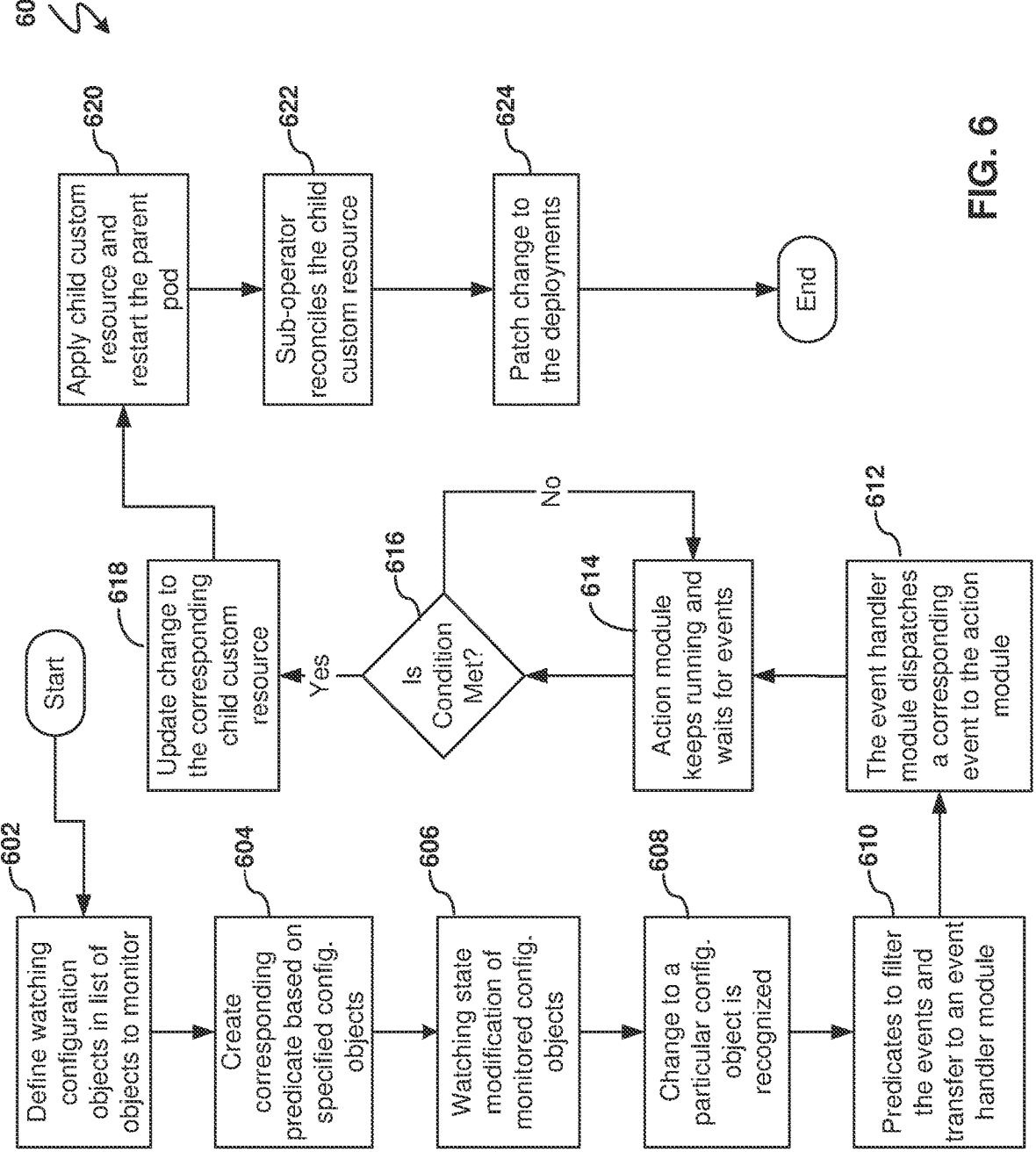
FIG. 6 illustrates a process for accelerating sub-operator reconciliation according to at least one embodiment.

FIG. 6 illustrates a sub-operator acceleration process 600 which summarizes the above-described method according to at least one embodiment.

In some embodiments, step 602 occurs as a first step of the process 600 after the start of the process 600. In step 602, watching configuration objects are defined in a list of objects to monitor. The program 916 performs this step automatically in response to the program 916 being initiated by a user. In other embodiments, a user manually uses a computer input device to access a user interface of the program 916 to enter in the designated configuration objects to watch in the list. FIG. 3 showed an example of this list 306 of objects to watch. Additional language is added to the software structure to cause automatic monitoring of child container orchestrator-relevant resources of a parent container for a state modification. The automatic monitoring is not comprehensive monitoring of all resources of the parent container.

In step 604 of the process 600, a corresponding predicate is created based on the specified configuration object. The specific configuration object refers to the configuration objects defined in the list in step 602. FIG. 3 showed that monitoring predicates 310 were added to correspond to the new additions to the list 306 of objects to watch. In some embodiments the listener module 702 of the program 916 creates these one or more predicates of step 604.

In step 606 of the process 600, the state modification of monitored configuration objects is watched. The monitored configuration objects refers to those defined in step 602. In one embodiment, this watching is performed by the watcher module 308 retrieving logs of the parent operator to identify state modifications.

In step 608 of the process 600, a change to a particular configuration object is recognized. This recognition occurs because of the watching that is being performed in step 606. The listener module 702 compares the retrieved logs with the predicates 310 to identify any condition indicating that a monitored child container orchestrator-relevant resource of the parent container has undergone a state modification. Text matching with the logs and predicates is performed as a part of step 608 in some embodiments.

In step 610 of the process 600, predicates filter the events and transfer to an event handler module. The predicates 310 help perform the change recognition but eliminate unrelated changes. The predicate filtering will allow changes to resources of a sub-operator that has been designated to pass through. In response to the change passing through, the listener module 702 transfers the event to the event handler module 316 which is part of the action module 704.

In step 612 of the process 600, the event handler module 316 dispatches a corresponding event to the action module 704. The action module 704 has been programmed with code to execute in response to the trigger condition being met of a change to a child container orchestrator-relevant resource occurring in the custom resources of the parent container. To perform step 612, the event handler module 316 generates and transmits the notification to the action module 704 to execute the designated code.

In step 614 of the process 600, the action module 704 keeps running and waits for events. In step 616, a determination is made whether a condition has been met. If the determination is affirmative and the condition has been met, the process 600 proceeds to step 618. If the determination is negative and the condition has not been met, the process 600 loops back for a repeat of step 614. This small loop is not broken until the condition is met so the process proceeds to step 618.

In step 618 of the process 600, the change is updated to the corresponding child custom resource. For example, if a change in the parent custom resource 108 was recognized for resources related to the content orchestrator 112 (which is a child or sub-operator), then step 618 includes updating the content custom resource 122 according to the change in the parent. However the parent custom resource changed for this particular element, step 618 will make the same change for the custom resource of the child custom resource. The same could also occur to the automation custom resource 124 and/or to the document custom resource 126 if change(s) to the parent custom resource related to these two sub-operators were recognized. The action module 704 performs this update.

In step 620 of the process 600, the child custom resource is applied and the parent pod is restarted. This application refers to the child operator itself acting according to the new child custom resource update. For example, the content orchestrator 112 (which is a child/sub operator) operates according to the new update to the content custom resource that occurred in step 618. The parent pod 110 in FIG. 1 is one example of the parent pod to be restarted in step 620. This application is executed in the action module 704 in some embodiments. In some embodiments, the customer resources are updated in a cluster through a command line tool applying when a change is coming up. The restart of the parent operator pod helps avoid data inconsistency by having the child and parent orchestrators consume the same resources.

In step 622 of the process 600, the sub-operator reconciles the child custom resource. This step is triggered by the operator itself when the reconciler found the custom resources to have a state modification. The entirety of the playbook(s) is re-run based on the latest updates.

In step 624 of the process 600, the change is patched to the deployments. For example, if multiple copies/instances of a child/sub operator are part of the hierarchy the change is patched to each copy. This change is executed by the sub-operator during a run of the playbooks or role.

After step 624, the process 600 ends until another update happens that is recognized by the monitoring system and/or until a new sub-operator is added to the monitoring/updating program for additional reconcile acceleration.

FIG. 7 illustrates a reconcile acceleration program 700 which includes, in a first module tier, the parent container orchestrator 106, the parent custom resources 108, and the list 306 of objects to monitor. The reconcile acceleration program 700 includes in a second module tier the listener module 702 discussed above and the action module 70 also discussed above. The first module tier communicates with the second module tier. The reconcile acceleration program 700 includes a third module tier which includes the child operators, e.g., the child container orchestrators, e.g., the content orchestrator 112, the automation orchestrator 114, and the document orchestrator 116 which were used in the examples of FIGS. 1-3.

It may be appreciated that FIGS. 1-7 provide only illustrations of certain embodiments and do not imply any limitations with regard to how different embodiments may be implemented. Many modifications to the depicted embodiment(s), e.g., to particular steps, elements, number of elements, and/or order of depicted methods or components of a sub-operator reconciliation acceleration method/system may be made based on design and implementation requirements.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 900 contains an example of an environment for the execution of at least some of the computer code involved in performing the inventive methods, such as sub-operator reconcile acceleration program 916. In addition to sub-operator reconcile acceleration program 916, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and sub-operator reconcile acceleration program 916, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in sub-operator reconcile acceleration program 916 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in sub-operator reconcile acceleration program 916 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing exceptionally large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901) and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

The computer 901 in some embodiments also hosts one or more machine learning models. A machine learning model in one embodiment is stored in the persistent storage 913 of the computer 901. In some embodiments, one or more machine learning models are stored in computer memory of a computer positioned remotely from the computer 901, e.g., in a remote server 904 or in an end user device 903. In such embodiments, a remote machine learning model is configured to send its output back to the computer 901 so that inference results from using a trained ML model to analyze a sample is provided and presented to a user. The machine learning model receives a copy of the new data sample, performs machine learning analysis on the received sample, and transmits the results back to the computer 901.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The flowchart and block diagrams in the Figures illustrate the architecture, functionality, and operation of possible implementations of systems, methods, and computer program products according to various embodiments. In this regard, each block in the flowchart, pipeline, and/or block diagrams may represent a module, segment, or portion of instructions, which comprises one or more executable instructions for implementing the specified logical function(s).

What is claimed is:

1. A computer-implemented method comprising:
identifying, via automated parsing of a software code list of mappings of custom resources, a child container orchestrator in a resource distribution hierarchical relationship with a parent container orchestrator;
creating a respective monitoring predicate for a name of the identified child container orchestrator;
automatically monitoring a parent container for a state modification of resources related to the child container orchestrator, wherein the automatic monitoring is limited to configuration-scoped resources out of all resources of the parent container, and wherein the automatic monitoring uses the respective monitoring predicate to filter events based on the configuration-scoped resources;
in response to the monitoring recognizing the state modification, dispatching, by a listener module, an event message to an action module and updating the child container orchestrator with the state modification by updating a corresponding child custom resource to reflect a configuration change; and
running a first application that utilizes the updated child container orchestrator.

2. The computer-implemented method of claim 1, wherein the automatic monitoring is performed via a listener module and the updating is performed via an action module.

3. The computer-implemented method of claim 2, wherein: the listener module dispatches an event message to the action module in response to recognizing the state modification, and the action module performs the updating in response to receiving the event message.

4. The computer-implemented method of claim 1, further comprising receiving a designation of the child container orchestrator and adding a name of the designated child container orchestrator to a software code list of mappings of custom resources.

5. The computer-implemented method of claim 1, wherein the updating the child container orchestrator with the state modification comprises updating custom resources of the child container orchestrator and applying the updated custom resources of the child container orchestrator.

6. The computer-implemented method of claim 1, further comprising restarting an operator pod of the parent container orchestrator in response to the child container orchestrator being updated with the state modification.

7. The computer-implemented method of claim 1, further comprising deploying the first application that utilizes the updated child container orchestrator.

8. A computer system comprising:
one or more processors, one or more computer-readable memories, and program instructions stored on at least one of the one or more computer-readable memories for execution by at least one of the one or more processors to cause the computer system to:
identify, via automated parsing of a software code list of mappings of custom resources, a child container orchestrator in a resource distribution hierarchical relationship with a parent container orchestrator;
create a respective monitoring predicate for a name of the identified child container orchestrator;
automatically monitoring a parent container for a state modification of resources related to the child container orchestrator, wherein the automatic monitoring is limited to configuration-scoped resources out of all resources of the parent container, and wherein the automatic monitoring uses the respective monitoring predicate to filter events based on the configuration-scoped resources;
in response to the monitoring recognizing the state modification, dispatching, by a listener module, an event message to an action module and updating the child container orchestrator with the state modification by updating a corresponding child custom resource to reflect a configuration change; and
run a first application that utilizes the updated child container orchestrator.

9. The computer system of claim 8, wherein the automatic monitoring is performed via a listener module and the updating is performed via an action module.

10. The computer system of claim 9, wherein: the listener module dispatches an event message to the action module in response to recognizing the state modification, and the action module performs the updating in response to receiving the event message.

11. The computer system of claim 8, wherein the program instructions are further for execution to cause the computer system to: receive a designation of the child container orchestrator and add a name of the designated child container orchestrator to a software code list of mappings of custom resources.

12. The computer system of claim 8, wherein the updating the child container orchestrator with the state modification comprises updating custom resources of the child container orchestrator and applying the updated custom resources of the child container orchestrator.

13. The computer system of claim 8, wherein the program instructions are further for execution to cause the computer system to restart an operator pod of the parent container orchestrator in response to the child container orchestrator being updated with the state modification.

14. The computer system of claim 8, wherein the program instructions further cause the computer system to deploy the first application that utilizes the updated child container orchestrator.

15. A computer program product comprising a computer-readable storage medium having program instructions embodied therewith, the program instructions executable by a computer to cause the computer to:
identify, via automated parsing of a software code list of mappings of custom resources, a child container orchestrator in a resource distribution hierarchical relationship with a parent container orchestrator;
create a respective monitoring predicate for a name of the identified child container orchestrator;
automatically monitoring a parent container for a state modification of resources related to the child container orchestrator, wherein the automatic monitoring is limited to configuration-scoped resources out of all resources of the parent container, and wherein the automatic monitoring uses the respective monitoring predicate to filter events based on the configuration-scoped resources;

in response to the monitoring recognizing the state modification, dispatching, by a listener module, an event message to an action module and updating the child container orchestrator with the state modification by updating a corresponding child custom resource to reflect a configuration change; and run a first application that utilizes the updated child container orchestrator.

16. The computer program product of claim 15, wherein the automatic monitoring is performed via a listener module and the updating is performed via an action module.

17. The computer program product of claim 16, wherein: the listener module dispatches an event message to the action module in response to recognizing the state modification, and the action module performs the updating in response to receiving the event message.

18. The computer program product of claim 15, wherein the program instructions are further for execution to cause the computer to: receive a designation of the child container orchestrator and add a name of the designated child container orchestrator to a software code list of mappings of custom resources.

19. The computer program product of claim 15, wherein the updating the child container orchestrator with the state modification comprises updating custom resources of the child container orchestrator and applying the updated custom resources of the child container orchestrator.

20. The computer program product of claim 15, wherein the program instructions further cause the computer program product to deploy the first application that utilizes the updated child container orchestrator.

* * * * *